United States Patent
Tsai et al.

(10) Patent No.: US 9,116,411 B2
(45) Date of Patent: Aug. 25, 2015

(54) DISPLAY DEVICE AND MANUFACTURING METHOD THEREOF

(75) Inventors: Yuan-Chih Tsai, Hsinchu (TW); Chi-Ming Wu, Hsinchu (TW); Ming-Sheng Chiang, Hsinchu (TW); Hung-Yi Tsai, Hsinchu (TW); Jen-Shiun Huang, Hsinchu (TW); Ta-Nien Luan, Hsinchu (TW); Wen-Chang Lu, Hsinchu (TW); Lee-Tyng Chen, Hsinchu (TW); You-Chi Tsai, Hsinchu (TW)

(73) Assignee: E INK HOLDINGS INC., Hsinchu (TW)

( * ) Notice: Subject to any disclaimer, the term of this patent is extended or adjusted under 35 U.S.C. 154(b) by 285 days.

(21) Appl. No.: 12/964,341

(22) Filed: Dec. 9, 2010

(65) Prior Publication Data

US 2012/0026577 A1 Feb. 2, 2012

(30) Foreign Application Priority Data

Jul. 28, 2010 (TW) .............................. 99124936 A

(51) Int. Cl.
*G02F 1/167* (2006.01)
*H01J 9/20* (2006.01)
*H01J 11/48* (2012.01)

(52) U.S. Cl.
CPC .......... *G02F 1/167* (2013.01); *G02F 2201/503* (2013.01); *H01J 9/20* (2013.01); *H01J 11/48* (2013.01); *H01J 2329/28* (2013.01); *H01J 2329/862* (2013.01)

(58) Field of Classification Search
CPC .............. G02F 2201/503; G02F 2001/133311; G02F 2001/133325; H01J 9/20; H01J 11/48; H01J 2329/28; H01J 2329/862
USPC ....................... 359/296; 313/509, 512; 445/25
See application file for complete search history.

(56) References Cited

U.S. PATENT DOCUMENTS

| | | | |
|---|---|---|---|
| 7,112,115 B1 * | 9/2006 | Yamazaki et al. ............... 445/25 |
| 7,114,864 B2 * | 10/2006 | Shimoda et al. ................ 359/296 |
| 7,573,547 B2 * | 8/2009 | Palmateer et al. .............. 349/106 |
| 7,719,745 B2 * | 5/2010 | Yamada ......................... 359/245 |
| 7,786,559 B2 * | 8/2010 | Bayne et al. ................... 257/678 |
| 7,969,539 B2 * | 6/2011 | Sakurai ......................... 359/245 |
| 8,093,512 B2 * | 1/2012 | Chen et al. ..................... 174/523 |
| 2007/0120132 A1 * | 5/2007 | Maruyama et al. ............. 257/79 |

(Continued)

FOREIGN PATENT DOCUMENTS

| | | |
|---|---|---|
| CN | 1538212 | 10/2004 |
| CN | 1758128 | 4/2006 |

(Continued)

OTHER PUBLICATIONS

Chinese Patent Office issued Office Action Mar. 4, 2013.
Taiwan Intellectual Property Office, "Office Action", Jan. 8, 2014.

*Primary Examiner* — Zachary Wilkes
(74) *Attorney, Agent, or Firm* — WPAT, PC; Justin King

(57) ABSTRACT

A display device includes an active element array substrate, a display layer and a transparent shock absorption layer. The display layer is disposed on the active element array substrate. The transparent shock absorption layer is disposed on the display layer. The transparent shock absorption layer is formed by curing liquid adhesive material. A manufacturing method of display device is also provided.

10 Claims, 2 Drawing Sheets

(56) References Cited

U.S. PATENT DOCUMENTS

2008/0120946 A1  5/2008  Bayne et al.
2008/0230177 A1* 9/2008  Crouser et al. ............. 156/275.5
2009/0183819 A1* 7/2009  Matsuhira ....................... 156/99
2009/0257010 A1  10/2009 Sakurai

FOREIGN PATENT DOCUMENTS

| CN | 101187768   | 5/2008  |
|----|-------------|---------|
| TW | 200534198 A | 10/2005 |
| TW | 200619028 A | 6/2006  |

* cited by examiner

DISPLAY DEVICE AND MANUFACTURING METHOD THEREOF

FIELD OF THE INVENTION

The present invention relates to a display device and a manufacturing method thereof, and more particularly to an electronic paper display device and a manufacturing method thereof.

BACKGROUND OF THE INVENTION

With the development of science and technology, display devices develop toward the colorizing and flexible direction. Flexible display devices (such as electronic paper display devices) with touch display panels have an advantage of convenient operation.

FIG. 1 is a schematic, three-dimensional view of a conventional display device. Referring to FIG. 1, the conventional display device 100 includes an active element array substrate 110, a display layer 120 and a protecting layer 130. The protecting layer 130 is disposed above the active element array substrate 110. The display layer 120 is disposed between the active element array substrate 110 and the protecting layer 130. Since the protecting layer 130 is generally made of composite material, impact resistance of the protecting layer 130 is bad. When a heavy object falls down onto the protecting layer 130, circuits (not shown) on the active element array substrate 110 or the display layer 120 are easily broken to cause abnormal display. Moreover, when the display device 100 is acted upon by other improper external force, abnormal display is also easily generated because of damage of components of the display device 100.

SUMMARY OF THE INVENTION

The present invention provides a display device having good impact resistance and long service life. The display device includes an active element array substrate, a display layer and a transparent shock absorption layer. The display layer is disposed on the active element array substrate. The transparent shock absorption layer is disposed on the display layer. The transparent shock absorption layer is formed by curing liquid adhesive material.

In one embodiment of the present invention, the display device further includes a frame disposed on the display layer, and the transparent shock absorption layer is formed in the frame.

In one embodiment of the present invention, the display device further includes an upper panel disposed on the transparent shock absorption layer and the frame.

In one embodiment of the present invention, the upper panel includes a polyethylene terephthalate panel, a polycarbonate panel or a touch panel.

In one embodiment of the present invention, the active element array substrate includes a base, a thin film transistor array and a driving circuit. The thin film transistor array and the driving circuit are disposed on the base, and the driving circuit is electrically connected with the thin film transistor array.

In one embodiment of the present invention, the display device further includes a protecting layer disposed between the display layer and the transparent shock absorption layer.

In one embodiment of the present invention, the display device is an electronic paper display device.

The present invention provides a manufacturing method of display device by which a display device having good impact resistance can be manufactured in low cost. The manufacturing method of display device includes steps of: (a) providing an active element array substrate and a display layer, the display layer being disposed on the active element array substrate; (b) coating liquid adhesive material on the display layer; (c) curing the liquid adhesive material to form a transparent shock absorption layer.

In one embodiment of the present invention, after the step (a) and before the step (b), a frame is disposed on the display layer, and subsequently the liquid adhesive material is coated on the display layer and in the frame.

In one embodiment of the present invention, after the step (b) and before the step (c), an upper panel is disposed on the liquid adhesive material and the frame.

When the display device of the present invention is hit by the heavy object or is acted upon by improper external force, the transparent shock absorption layer can absorb the force. In such way, circuits of the display layer or the active element array substrate are not easily damaged to cause abnormal display, thereby service life of the display device is prolonged.

BRIEF DESCRIPTION OF THE DRAWINGS

The above objects and advantages of the present invention will become more readily apparent to those ordinarily skilled in the art after reviewing the following detailed description and accompanying drawings, in which.

DETAILED DESCRIPTION OF PREFERRED EMBODIMENTS

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 2:
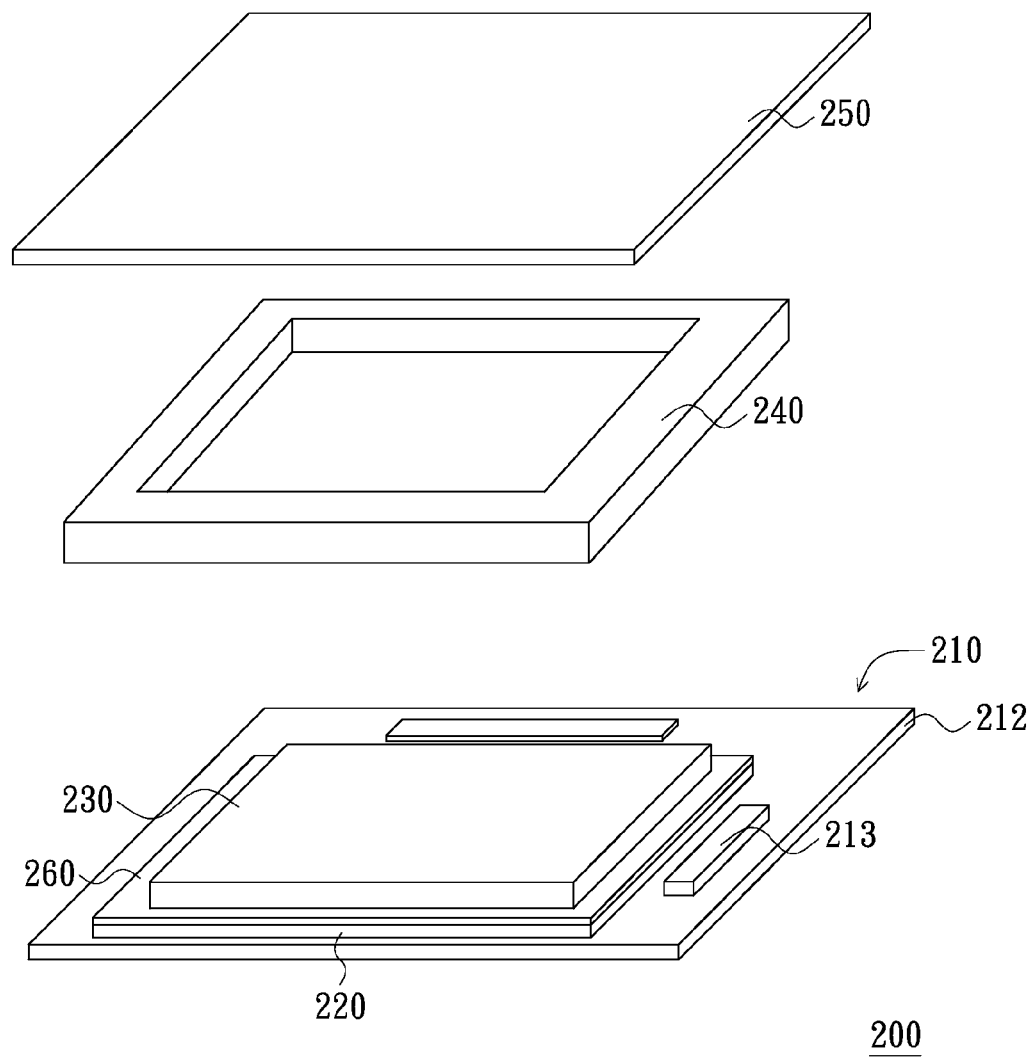
FIG. 2 is a schematic, three-dimensional view of a display device according to an embodiment of the present invention.

FIG. 2 is a schematic, three-dimensional view of a display device according to an embodiment of the present invention. Referring to FIG. 2, a display device 200, for example, an electronic display device, includes an active element array substrate 210, a display layer 220 and a transparent shock absorption layer 230. The transparent shock absorption layer 230 is disposed above the active element array substrate 210 and is, for example, formed by curing liquid adhesive material. The display layer 220 is disposed between the active element array substrate 210 and the transparent shock absorption layer 230. The display layer 220 of the present embodiment can be, but not limited to, a microcup electrophoretic display layer, a microcapsule electrophoretic display layer, an electrowetting display layer or a liquid powder display layer.

More specifically, the active element array substrate 210 includes a base 212, a thin film transistor array (not shown) and a driving circuit 213. Materials of the base 212 include glass. The thin film transistor array is disposed on the base 212. The driving circuit 213 is disposed on edges of the base 212. The driving circuit 213 is electrically connected to the thin film transistor array so as to transmit signals to the thin film transistor array.

Particularly, since the transparent shock absorption layer 230 is formed by curing liquid adhesive material, in order to conveniently form the transparent shock absorption layer 230, the display device 200 of the present embodiment further includes a frame 240 disposed on the display layer 220. The frame 240 is disposed on edges of the display layer 220 without affecting visual range of the display device 200, and the transparent shock absorption layer 230 is formed in the frame 240.

In addition, the display device 200 of the present embodiment further includes an upper panel 250. The upper panel 250 is disposed on the transparent shock absorption layer 230 and the frame 240 so as to further promote impact resistance of the display device 200. The upper panel 250 includes a polyethylene terephthalate (PET) panel, a polycarbonate (PC) panel or a touch panel.

Figure 1:
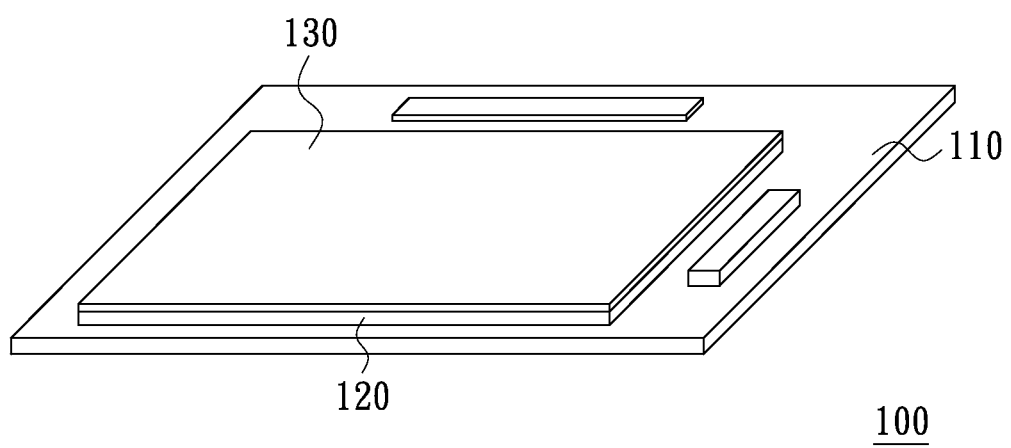
FIG. 1 is a schematic, three-dimensional view of a conventional display device.

Moreover, the display device 200 can also include a protecting layer 260 disposed between the display layer 220 and the transparent shock absorption layer 230. Material of the protecting layer 260 is the same as or is similar to the material of the protecting layer 130 of the conventional display device 100 of FIG. 1.

In order to make those ordinarily skilled in the art understand the present invention, a manufacturing method of the display device of the present invention will be described by an embodiment as following.

Referring to FIG. 2, a manufacturing method of the display device 200 is that, the display layer 220 is disposed on the active element array substrate 210 first and then the liquid adhesive material is coated on the display layer 220. It is worth mentioning that, before coating the liquid adhesive material on the display layer 220, in the present embodiment, the frame 240 is disposed the display layer 220, and then the liquid adhesive material is coated in a region surrounded by the frame 240 so as to limit the flow of the liquid adhesive material via the frame 240. After that, the liquid adhesive material is solidified to form the transparent shock absorption layer 230. In the meantime, the shape and thickness of the transparent shock absorption layer 230 are determined by a shape of the region surrounded by the frame 240 and a height of the frame 240. Although the frame 240 shown in FIG. 2 is square-shaped, the present invention does not limit the shape of the frame 240. The shape and height of the frame 240 can be arbitrarily prescribed according to actual requirements.

Moreover, as mentioned above, in the present embodiment, before coating the liquid adhesive material on the display layer 220, the protecting layer 260 is attached to the display layer 220.

It should be pointed out that, after coating the liquid adhesive material on the display layer 220 and before curing the liquid adhesive material, the upper panel 250 is disposed on the liquid adhesive material and the frame 240, so as to further promote impact resistance of the display device 200.

In summary, the display device and the manufacturing method thereof at least have one of the following advantages:

1. When the display device of the present invention is shocked the heavy object or is acted upon by improper external force, the transparent shock absorption layer can buff the force and distribute the force to each layer of the display device. In such way, circuits of the display layer or the transparent shock absorption layer are not easily damaged to cause abnormal display; thereby service life of the display device is prolonged.

2. In the manufacturing method of the display device of the present invention, the transparent shock absorption layer is formed by curing liquid adhesive material, the manufacturing procedure is simple.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A display device comprising:
    an active element array substrate;
    a display layer disposed on the active element array substrate;
    a frame disposed on edges of the display layer and entirely located above the display layer, the frame forming an enclosed shape; and
    a transparent shock absorption layer disposed on the display layer and in the frame, wherein the transparent shock absorption layer is formed by curing liquid adhesive material, a shape and a thickness of the transparent shock absorption layer are determined by a shape of a region surrounded by the frame and a height of the frame, side surfaces of the transparent shock absorption layer are spaced from side surfaces of the display layer, and an inner perimeter of the frame and an outer perimeter of the cured transparent shock absorption layer are each less than a perimeter of the side surfaces of the display layer.

2. The display device according to claim 1, further comprising an upper panel disposed on the transparent shock absorption layer and the frame.

3. The display device according to claim 2, wherein the upper panel comprises a polyethylene terephthalate panel, a polycarbonate panel or a touch panel.

4. The display device according to claim 1, wherein the active element array substrate comprises a base, a thin film transistor array and a driving circuit, the thin film transistor array and the driving circuit are disposed on the base, and the driving circuit is electrically connected the thin film transistor array.

5. The display device according to claim 1, further comprising a protecting layer disposed between the display layer and the transparent shock absorption layer.

6. The display device according to claim 1, wherein the display device is an electronic paper display device.

7. The display device according to claim 4, wherein the driving circuit is disposed outside the frame.

8. A manufacturing method of display device comprising steps of:
    (a) providing an active element array substrate and a display layer, the display layer being disposed on the active element array substrate;
    (b) coating liquid adhesive material on the display layer;
    (c) curing the liquid adhesive material to form a transparent shock absorption layer, wherein after the step (a) and before the step (b), an enclosed shape frame is disposed on edges of the display layer and entirely located above the display layer, and the liquid adhesive material is coated in the frame and positioned via the frame,
    wherein a shape and a thickness of the transparent shock absorption layer are determined by a shape of a region surrounded by the frame and a height of the frame, side surfaces of the transparent shock absorption layer are spaced from side surfaces of the display layer, and an inner perimeter of the frame and an outer perimeter of the cured transparent shock absorption layer are each less than a perimeter of the side surfaces of the display layer.

9. The manufacturing method of display device according to claim 8, wherein after the step (b) and before the step (c), an upper panel is disposed on the liquid adhesive material and the frame.

10. The manufacturing method of display device according to claim 8, wherein the active element array substrate comprises a base, a thin film transistor array and a driving circuit, the thin film transistor array and the driving circuit are disposed on the base, the driving circuit is electrically connected the thin film transistor array, and the driving circuit is disposed outside the frame.

* * * * *